Feb. 20, 1962 C. N. BREWER 3,021,998

ELECTRICALLY OPERATED TAPE PERFORATING MACHINE

Filed Sept. 26, 1958 7 Sheets-Sheet 1

INVENTOR

CLAIRE N. BREWER

BY Scrivener & Parker

ATTORNEYS

INVENTOR
CLAIRE N. BREWER

BY Scrivener & Parker
ATTORNEYS

Feb. 20, 1962 C. N. BREWER 3,021,998

ELECTRICALLY OPERATED TAPE PERFORATING MACHINE

Filed Sept. 26, 1958 7 Sheets-Sheet 3

INVENTOR
CLAIRE N. BREWER

BY Scrivener & Parker
ATTORNEYS

Feb. 20, 1962 C. N. BREWER 3,021,998

ELECTRICALLY OPERATED TAPE PERFORATING MACHINE

Filed Sept. 26, 1958 7 Sheets-Sheet 4

INVENTOR
CLAIRE N. BREWER

BY

Scrivener & Parker ATTORNEYS

Feb. 20, 1962 C. N. BREWER 3,021,998

ELECTRICALLY OPERATED TAPE PERFORATING MACHINE

Filed Sept. 26, 1958 7 Sheets-Sheet 5

INVENTOR
CLAIRE N. BREWER

BY Scrivener & Parker ATTORNEYS

INVENTOR
CLAIRE N. BREWER
BY Scrivener + Parker
ATTORNEYS

Feb. 20, 1962 C. N. BREWER 3,021,998

ELECTRICALLY OPERATED TAPE PERFORATING MACHINE

Filed Sept. 26, 1958 7 Sheets-Sheet 7

INVENTOR
CLAIRE N. BREWER

BY Scrivener & Parker
ATTORNEYS

1

3,021,998

ELECTRICALLY OPERATED TAPE PERFORATING MACHINE

Claire N. Brewer, Indianapolis, Ind., assignor to International Typographical Union of North America, Indianapolis, Ind.

Filed Sept. 26, 1958, Ser. No. 763,568
10 Claims. (Cl. 234—11)

This application is a continuation-in-part of my copending application Serial No. 602,850, filed August 8, 1956, now abandoned for Electrically Operated Tape Perforating Machine.

This invention relates to machines for perforating tape which is subsequently used to control machines for setting and casting type, or for printing or typing either locally or at a distance, and similar machines. Such tape perforating machines are well known and a typical machine, which is commercially available, is known as the Teletypesetter. This commercially available machine and various parts and assemblies thereof are described in numerous United States Letters Patent, some of which will be referred to in this specification for a better understanding of such a machine, and among these Letters Patent are the following:

| United States Letters Patent: | Date of issue |
|---|---|
| 1,811,131 | June 23, 1931. |
| 1,811,133 | June 23, 1931. |
| 1,821,109 | September 1, 1931. |
| 1,821,110 | September 1, 1931. |
| 1,821,165 | September 1, 1931. |
| 1,884,753 | October 25, 1932. |
| 1,968,056 | July 31, 1934. |
| 1,968,059 | July 31, 1934. |
| 1,969,891 | August 14, 1934. |
| 1,984,317 | December 11, 1934. |
| 2,000,029 | May 7, 1935. |
| 2,019,505 | November 5, 1935. |
| 2,024,006 | December 10, 1935. |
| 2,021,151 | November 19, 1935. |
| 2,021,419 | November 19, 1935. |
| 2,059,250 | November 3, 1936. |
| 2,069,240 | February 2, 1937. |
| 2,077,404 | April 20, 1937. |
| 2,083,608 | June 15, 1937. |
| 2,189,545 | February 6, 1948. |
| 2,562,737 | July 31, 1951. |

It has, for many years, been the general practice in the printing art to set and cast type by the use of machines such as the Linotype and Intertype. Such machines are equipped with a special keyboard usually having ninety keys, although sometimes a greater and sometimes a smaller number of keys are provided, and the operation of such machines must be performed by highly skilled personnel who are to operate the special keyboard and perform other duties essential to the most efficient operation of these very complex machines.

It has heretofore been proposed to operate machines of this type, which are referred to hereinafter as "typesetting machines," by means of a perforated tape prepared on a machine having a keyboard which corresponds to the standard typewriter keyboard with the addition of certain keys for performing operations and producing characters which are necessary in printing but not in typewriting. Such a machine is now available commercially and is known as the Teletypesetter. It has been found, however, that the overall efficiency and cost of setting and casting with the use of such perforated tape are less favorable than the efficiency and cost of operation with the use of typesetting machine operators who are skilled in the operation of setting and casting machine having the

2 standard keyboard of such machines. The use of machines for perforating tape for the operation of typesetting machines has become widespread, however, and it will be apparent that further and very important advantages would be produced in the overall efficiency and costs of a printing plant by the operation of such machines by perforated tape prepared on machines operated by skilled operators having knowledge of the entire typesetting, type-casting, and printing operations and, particularly, being skilled in the use of the standard Linotype keyboard.

In my United States Letters Patent Nos. 2,679,902, 2,737,240 and 2,737,616 there are disclosed and claimed apparatus and means for operating the usual keys of the keyboard of a tape perforating machine such as a Teletypesetter by means of a separate, standard Linotype keyboard superimposed on the Teletypesetter keyboard and operating the keys thereof through the intermediary of solenoids included in electric circuits controlled by the keys of the superimposed keyboard. This apparatus and means have proved highly successful and enable operation of the tape perforating machine by skilled typesetting machine operators. This present invention constitutes a far-reaching advance beyond the apparatus and means disclosed in these patents.

It has been a principal object of the invention to provide a tape perforating machine having the construction and mode of operation and producing the end product of the Teletypesetter machine but having, and being operated by, a keyboard which is substantially or exactly the same as the standard typesetting machine keyboard, but without the interposition of the solenoids which, in the apparatus of my Letters Patent referred to above, were provided to operate the conventional keys of the standard Teletypesetter keyboard. In other words, this principal object of the invention has been to provide a tape perforating machine, such as a Teletypesetter, the operating parts of which are directly operated and controlled by a keyboard which is substantially or exactly the same as the conventional type-setting machine keyboard, and which keyboard is substituted for the usual and conventional keyboard of the Teletypesetter machine.

In perforating tape which is used to operate a typesetting machine, the same characteristic perforation is made for each separate letter or symbol, regardless of whether upper case or lower case is to be set by the typesetting machine. In order to cause the typesetting machine to set upper case or lower case, as desired, a "shift" or "unshift" perforation is made in the tape before any series of letter or symbol perforations in order to cause the typesetting machine controlled by the tape to cast all of the following letter or symbol perforations in upper case or lower case until the other one of the shift and unshift perforations appears in the tape. In the Teletypesetter machine there are a shift key and an unshift key which are separate from the character and symbol keys and one of which must be depressed before operating one or a sequence of keys of the same case. Thus, if the word "The" is to be cast, the sequence of operation of keys of the Teletypesetter machine is (1) the shift key, if the last preceding character or symbol was lower case, (2) the character key "T," (3) the unshift key, and (4) the character keys "h" and "e." A further principal object of the invention is related to this explanation and is to provide a tape perforating machine of the described type having control and operating means which do not require the separate operation of a shift or unshift key to produce the characteristic shift or unshift tape perforation, but which control and operating means produce first a characteristic shift or unshift perforation on operation of an upper or lower case character key and then, without further operation of any key, produce a perforation which is characteristic of the letter or character of the depressed key, thus producing two successive tape perforations at each single key operation under those conditions requiring a shift or unshift perforation. In connection with this object of the invention, a further object has been to provide a tape perforating machine of the described type having a keyboard having separate keys for the upper and lower cases of every character or symbol which has both upper and lower cases in the typesetting operation, together with means for producing a shift perforation on operation of an upper case key, provided the last of the shift and unshift keys to be operated was lower case, and then the characteristic perforation for the operated key, and for producing an unshift perforation on operation of a lower case key, provided the last of the shift and unshift keys to be operated was upper case, and then the characteristic perforation for the operated key.

Tape perforating machines of the described type, such as the Teletypesetter, are entirely mechanical in operation excepting only the electric motor which drives the shaft from which movement is derived by the mechanical parts, and such machines depend for their operation on mechanical linkages and combinations of parts. It has been a principal object of this invention to provide a machine of this type in which the basic mechanical linkages and combination of parts are retained in their usual and conventional structure and arrangement and perform the same functions as they perform in the usual machines, but are controlled by electrical means energized upon operation of the keys of the Linotype keyboard which forms part of the improved machine. As a corollary to this object, it has been an object of this invention to provide a machine of the described type having control means for the usual and conventional operating mechanism of the machine, which control means is so constructed and operable that it permits the use of a Linotype keyboard as part of the machine instead of the usual typewriter keyboard of such machines.

A tape perforating machine of the described type is described in part in the following specification and is illustrated in part in the accompanying drawings. While these drawings fully disclose the present invention they do not disclose all parts of the tape perforating machine with which the invention is useful, of which it forms a part, and which it controls. However, all parts of such a machine which are necessary to an understanding of the invention are described in various of the Letters Patent listed hereinbefore and these patents will be referred to hereinafter whenever their disclosure will provide a full description of the structure and operation of some part or assembly of that part of the tape perforating machine which does not form part of this invention. The drawings forming part of this specification are described as follows:

Figure 8A:
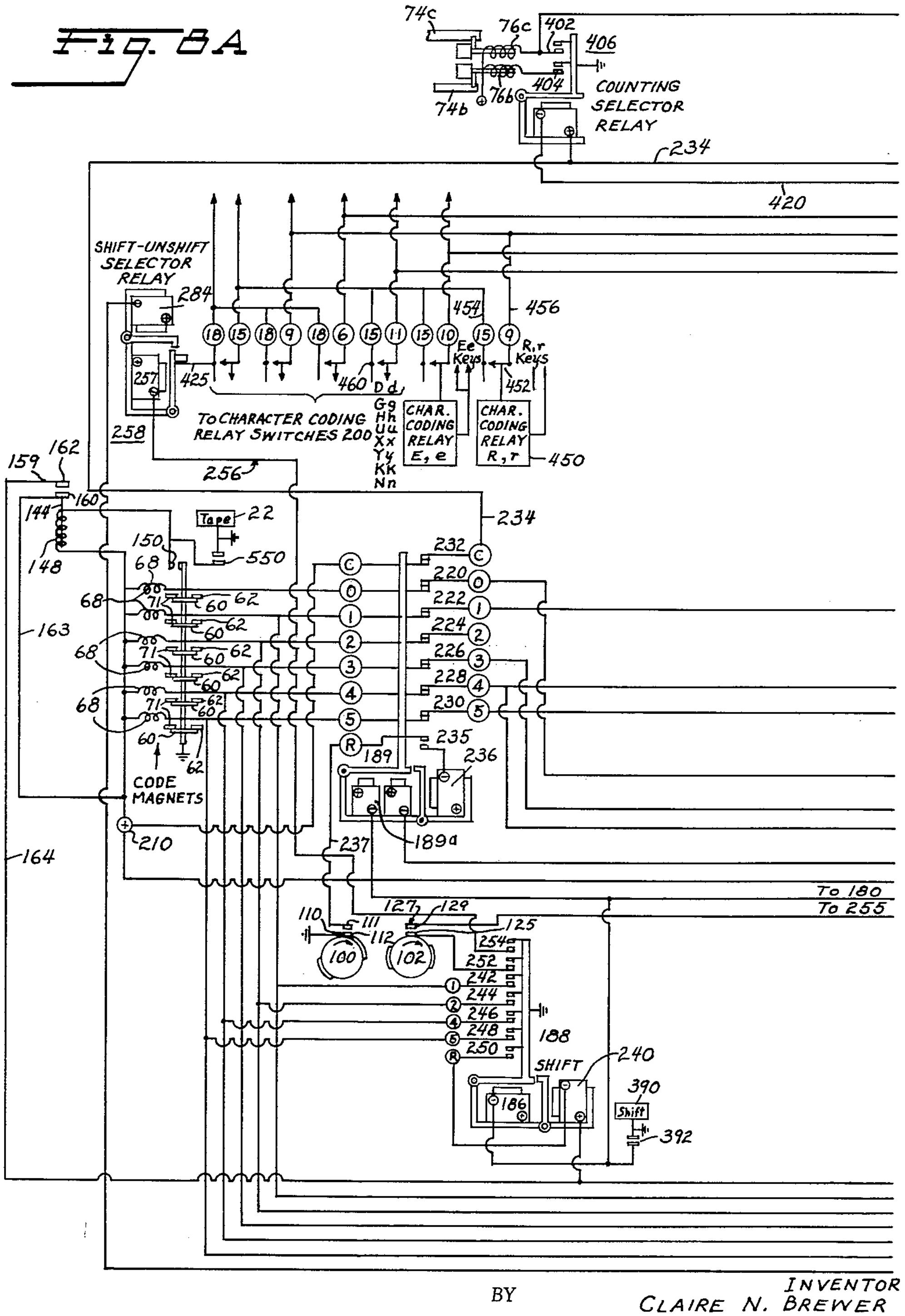
Figure 8B:
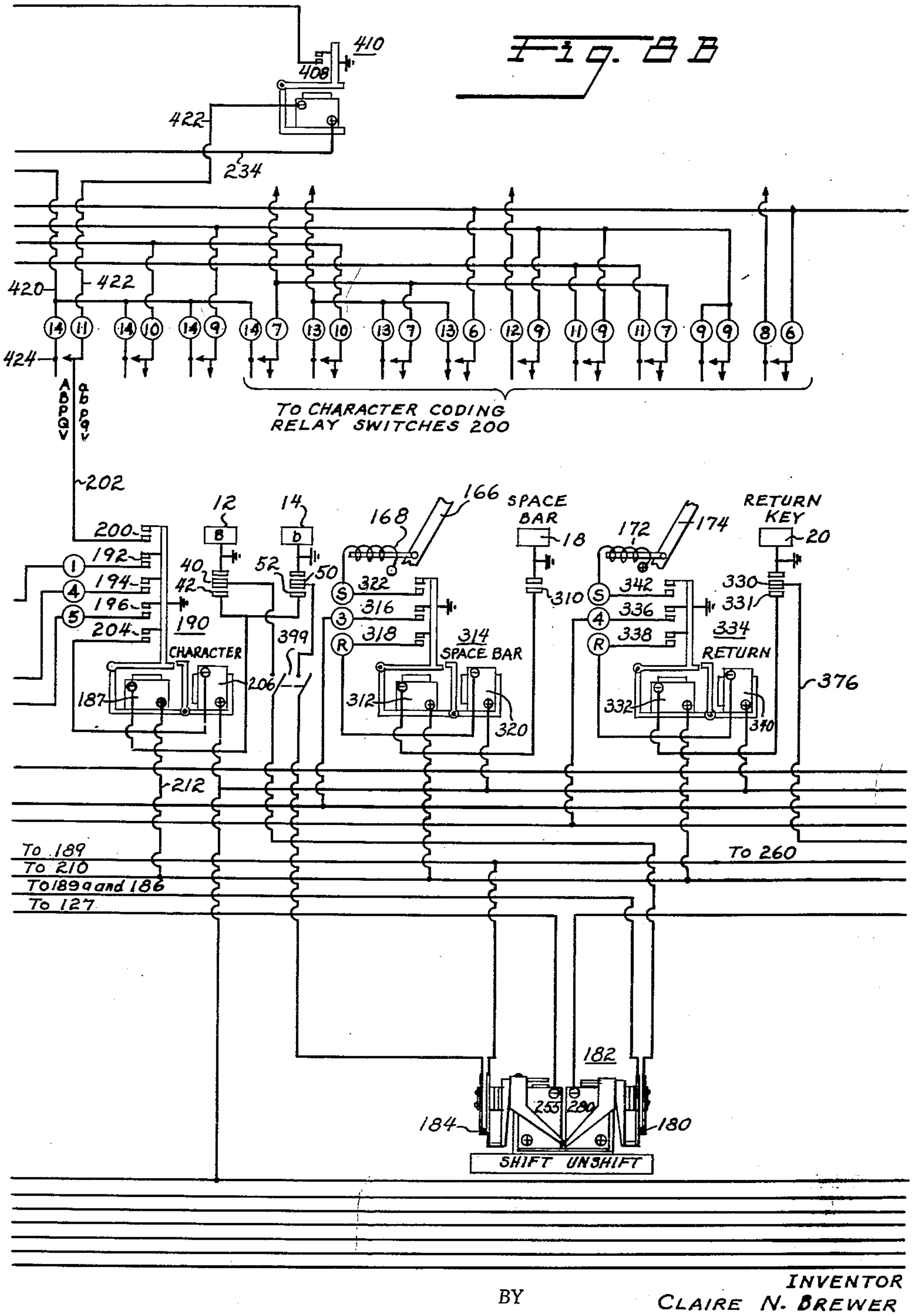
Figure 8C:
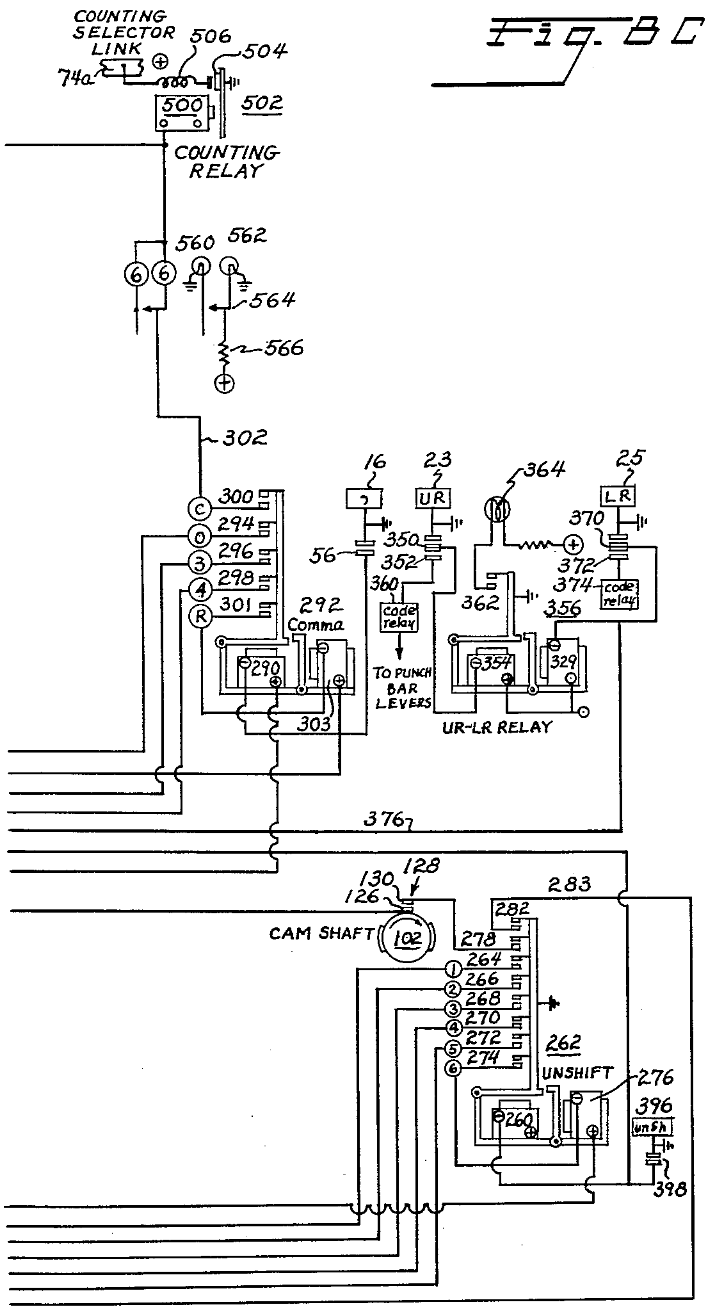
Figures 9, 10A, 10B, 11A, 11B:
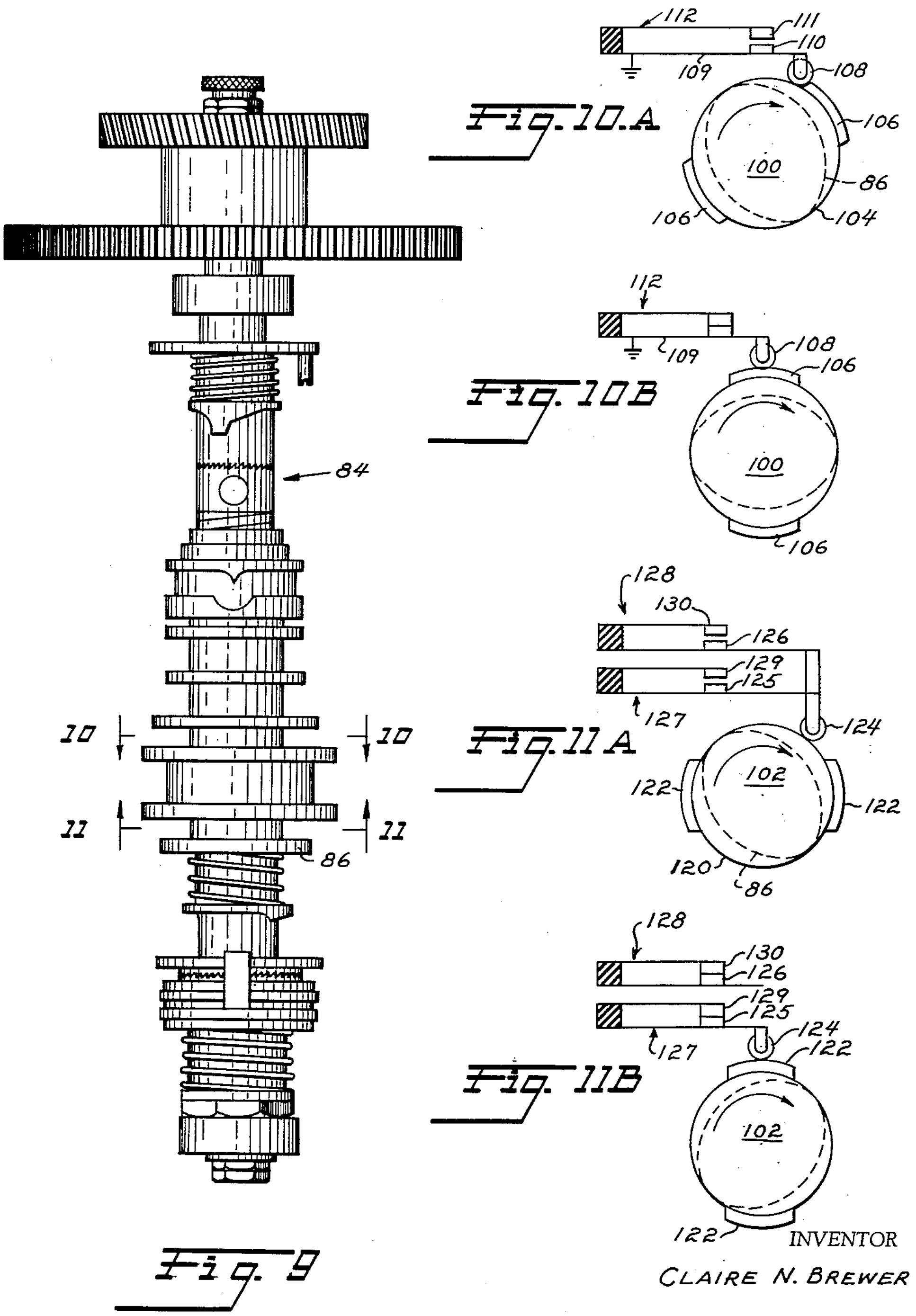

FIGS. 8A, 8B and 8C, taken together and arranged side by side, constitute a wiring diagram of the operating and control means provided by this invention, and show also, in representative form, the various parts of the tape perforating machine operated by the operating and control means;

FIG. 9 is a plan view of the conventional main operating shaft of the tape perforating machine, showing the two cams added thereto in accordance with this invention;

FIGS. 10A and 10B are taken on line 10—10 of FIG. 9 and show the two positions of one of the cams added to the main shaft and the switches which are operated by this cam, and FIGS. 11A and 11B are taken on line 11—11 of FIG. 9 and show the two positoins of the second cam added to the main shaft and the switches which are operated by this cam.

There are now commercially available many machines for providing a variety of punching operations, including the perforation of tape. However, because of the peculiar requirements of printing, such as justification, the use of upper and lower case, the succession of lines, and the like, perforating machines of general application cannot be used to perforate tape which is used to control a typesetting machine. Such tape must be perforated on a special machine and only one such machine is now available, this being the Teletypesetter, and my invention relates to the improvement of such a machine and will be so described in this specification. The Teletypesetter machine (hereinafter sometimes referred to as the TTS) comprises a keyboard and mechanism which is operated by the depression of the keys to perforate tape fed through the machine and to count the number of units of width of characters represented by the perforations which have been made, thereby to indicate to the operator his approach to a pre-determined total number of units, thus permitting justification.

The keyboard of a Teletypesetter machine has all of the character keys of the conventional typewriter keyboard, arranged in the same positions, and also has additional character keys which are required for printing but are not required for typewriting. In addition, this keyboard has a shift key and an unshift key which, when operated, produce characteristic tape perforations which cause the typesetting machine operated and controlled by the tape to set upper case or lower case characters corresponding to subsequent tape perforations, depending on which of the shift and unshift keys was last operated. Thus, for example, operation of the "A" key will always produce the same characteristic tape perforation, but the typesetting machine controlled and operated by the tape will set and cast an upper case "A" or a lower case "a" depending on whether the shift or unshift key was last operated prior to operation of the "A" key. Certain of the keys will produce both upper case and lower case characters and if such a key is operated after operation of the shift key and before operation of the unshift key a characteristic tape perforation corresponding to the upper case character is produced, while operaion of such a key after operation of the unshift key but before operation of the shift key produces a characteristic tape perforation corresponding to the lower case character. Others of the keys, when operated, produce the same perforation and cause the same operation of the typesetting machine regardless of whether the shift or unshift key was last previously operated. The keyboard is also provided with a space band bar which, when operated, produces a characteristic tape perforation which causes the typesetting machine controlled by the tape to act and cast a space. It will be apparent that in the operation of a typesetting machine by means of a tape produced on a machine such as that described, an upper case or lower case character will be set and cast by each tape perforation corresponding to one of the characters on the keyboard and, excepting only the no-shift character perforations, will be upper or lower case depending on whether a shift or an unshift perforation was last made in the tape.

Figure 1:
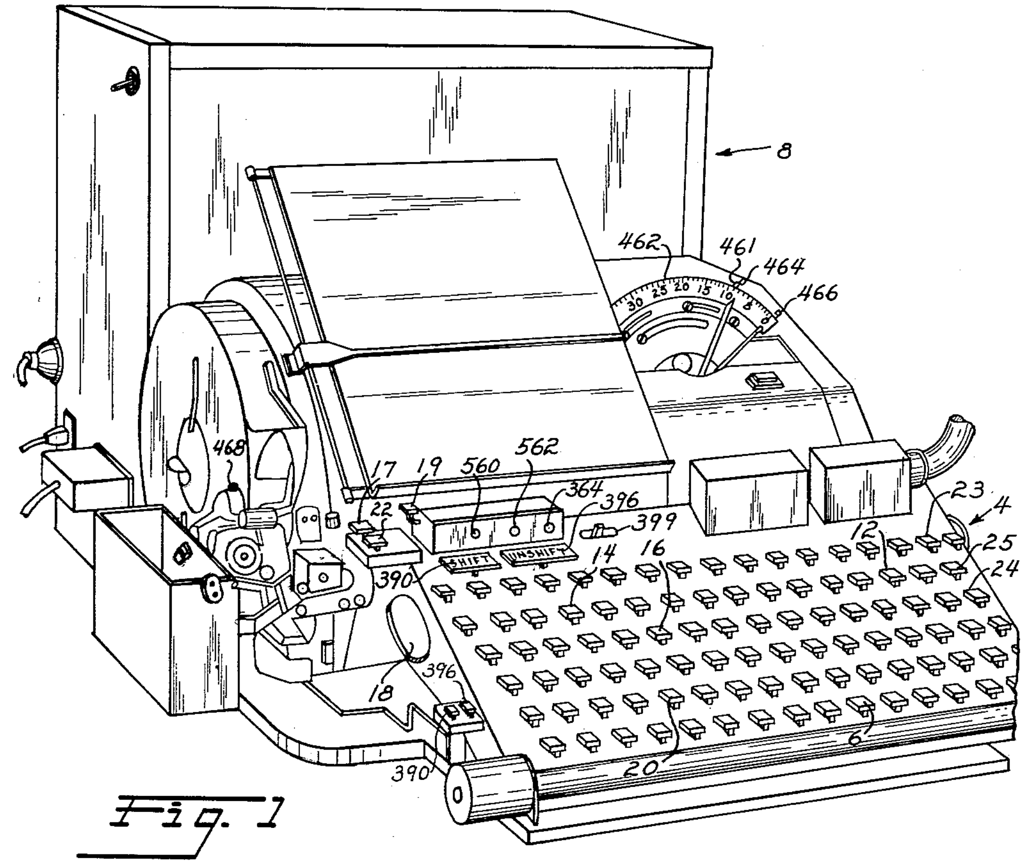
FIG. 1 is a perspective view of a tape perforating machine showing the application thereto of a Linotype keyboard and control means, all in accordance with this invention.
Figure 2:
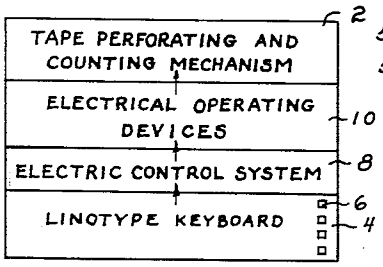
FIG. 2 is a diagrammatic view showing the relation of the basic elements of a machine provided by the invention.

In FIGS. 1 and 2 of the drawings the general relation of my invention to a standard TTS is shown. The standard mechanism of the TTS for perforating the tape and counting the number of unit widths of the characters represented by the perforations which have been made is represented at 2, it being understood that the standard mechanism has been modified in some respects by this invention and as will be more fully described in this specification. Those parts of this mechanism which have been modified in any way are particularly illustrated in other figures of the drawings, and those parts which are necessary to an understanding of this invention are shown partially or schematically in the overall schematic representation of the invention in FIG. 8 as well as in other figures. In accordance with this invention the standard typewriter keyboard of the TTS is replaced by a keyboard 4 which is exactly, or substantially, the same as the standard keyboard of a typesetting machine such as the Linotype or Intertype. In the standard TTS the keys of the keyboard are connected to and operate the perforating and counting mechanisms through mechanical linkages of various types. However, in the machine provided by this invention operation of each key 6 of the keyboard 4 energizes an electric control system 8 which includes electrical devices 10 which, when energized, impart movement to the operating parts of the TTS.

Figure 3:
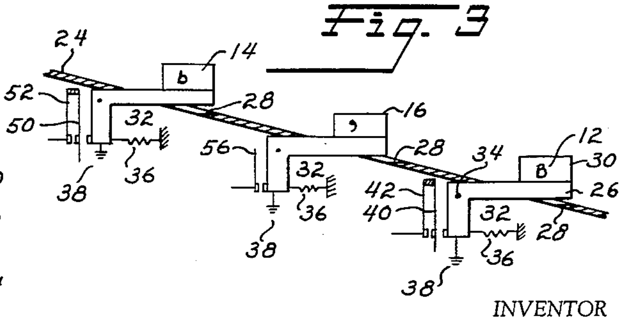
FIG. 3 is a sectional view through part of the keyboard of a machine according to the invention.

The Linotype keyboard which is substituted by this invention for the standard TTS keyboard is illustrated in FIGS. 1 and 3 of the drawings. In this keyboard the upper and lower cases of each latter and of certain other characters are represented on separate keys instead of on a single key as in the TTS. For example, there is an upper case "B" key 12 and a separate lower case "b" key 14. In addition, there are separate keys for various characters such as punctuation marks and the like, some of which are lower case and some of which are upper case on the TTS and consequently, on that machine, require depression of the shift key or the unshift key before any of these keys is operated to produce the desired character. In addition, there are other keys on the keyboard 4 which produce tape perforations which cause the same character to be set and cast regardless of whether the shift key or unshift key was last previously depressed, these being referred to as the no-shift keys of the keyboard 4 and being represented by the comma key 16. The keys of the keyboard 4 which correspond to the upper case characters which are set and cast by tape perforations occurring after a shift key tape perforation, are referred to as "upper case" keys. The keys which correspond to the lower case characters which are set and cast by tape perforations occurring after an unshift key perforation are referred to as "lower case" keys. In addition, the keyboard 4 includes a rub-out key 17, a space bar 18, a repeat key 19, a return key 20, a tape key 22, an upper rail key 23, a lower rail key 25 and other special keys.

A keyboard base plate 24 is provided as part of the structure of the machine and is inclined downwardly and forwardly from the front part of the supporting frame for the tape perforating and counting mechanism and is therefore in the same general position as the TTS keyboard. This base plate is preferably a flat sheet of metal and supports the keys 6 which substantially correspond in number and arrangement to the keys of the conventional keyboard of a typesetting machine. As shown in FIG. 3, each key is of right-angular shape, one arm 26 of which extends in a generally horizontal direction through a slot 28 in the keyboard base plate 24 and has a flat part 30 on its upper surface for engagement by the finger of the operator, which the other arm 32 extends vertically below the keyboard and is pivotally supported at 34 on or adjacent the lower side of keyboard base plate 24. A separate slot 28 is provided for each key and the lower, or forward, edge of each slot is under the corresponding end of the horizontal part of the key whereby, when the key is depressed, the lower surface of the arm will strike the base plate adjacent the forward end of the slot, thus providing a positive stop for the downward movement of the key. The lower end of each arm 32 is connected by a spring 36 to the machine frame whereby the key is normally held in raised position and is depressed against the force of the spring. Each key is electrically grounded to the machine frame as indicated at 38.

The key 12 which is marked with the upper case letter "B" is representative of all of the upper case character keys of the keyboard 4, the key 14 which is marked with the lower case letter "b" is representative of all of the lower case character keys of the keyboard, and the key 16 which is marked with a comma (,) is representative of all of the keys which, when operated, produce a tape perforation which will cause the typesetting machine to set and cast the same character regardless of whether the shift or unshift key was last previously operated.

Two spaced, insulated, flexible contact members 40, 42 are supported adjacent the vertical arm 32 of the "B" key 12 in the direction in which the arm will move when the key is depressed, whereby the arm, in so moving, will first engage contact member 40. Each upper case letter key of the keyboard 4 has associated with it two contact members corresponding in position and function to the contact members 40, 42, which are associated with the upper case "B" letter key.

Two spaced, insulated, flexible contact members 50, 52 are supported adjacent the vertical arm 32 of the "b" key 14 in the direction in which the arm will move when the key is depressed, whereby the arm, in so moving, will first engage contact member 50 and then move the same into engagement with contact member 52. Each lower case letter key of the keyboard 4 has associated with it two contact members corresponding in position and function to the contact members 50, 52 which are associated with the lower case "b" letter key of such keyboard.

A single, insulated flexible contact member 56 is supported adjacent the vertical arm 32 of the "comma" key 16 in the direction in which the arm will move when the key is depressed, whereby the arm in so moving will connect the contact member to ground. Each no-shift key of the keyboard 4 has associated with it one contact member corresponding in position and function to the contact member 56 which is associated with the "comma" key.

In the TTS there is a single key for each character, there being, for example, only a single key for the upper and lower cases of the letter "B." If it is desired to set an upper case "B" the shift key of the TTS keyboard is first depressed and then the "B" key is depressed, thus producing two tape perforations, these being the shift perforation and the "B" perforation. After being operated by the shift perforation the typesetting machine will continue to set upper case until an unshift perforation is reached, after which only lower case will be set until a shift perforation is reached. Further, if it is desired to set a lower case "b" the unshift key of the TTS keyboard is depressed and then the "B" key is depressed, thus producing two tape perforations, these being the unshift perforation and the "B" perforation. After being operated by these perforations the typesetting machine will continue to set lower case until a shift perforation is reached, after which only upper case will be set until an unshift perforation is reached.

In the TTS the operation of any key causes code bars, which are also known as perforating selector bars, to be moved downwardly and this movement is transmitted through levers to cause longitudinal movement of one or more of a group of selector bar links which, in turn, operate connected punch bar levers to set the same combination of punches below the tape in position to perforate the tape when the punch block is operated. These perforating selector bars, selector bar links, punch bar levers and their associated mechanism are conventional in the standard TTS, they are well known to the art, they are described and illustrated in certain of the Letters Patent referred to above (see, for example, No. 2,019,505) and their construction and mode of operation, except as modified by this invention, do not require further description in this specification.

Figures 4, 5:
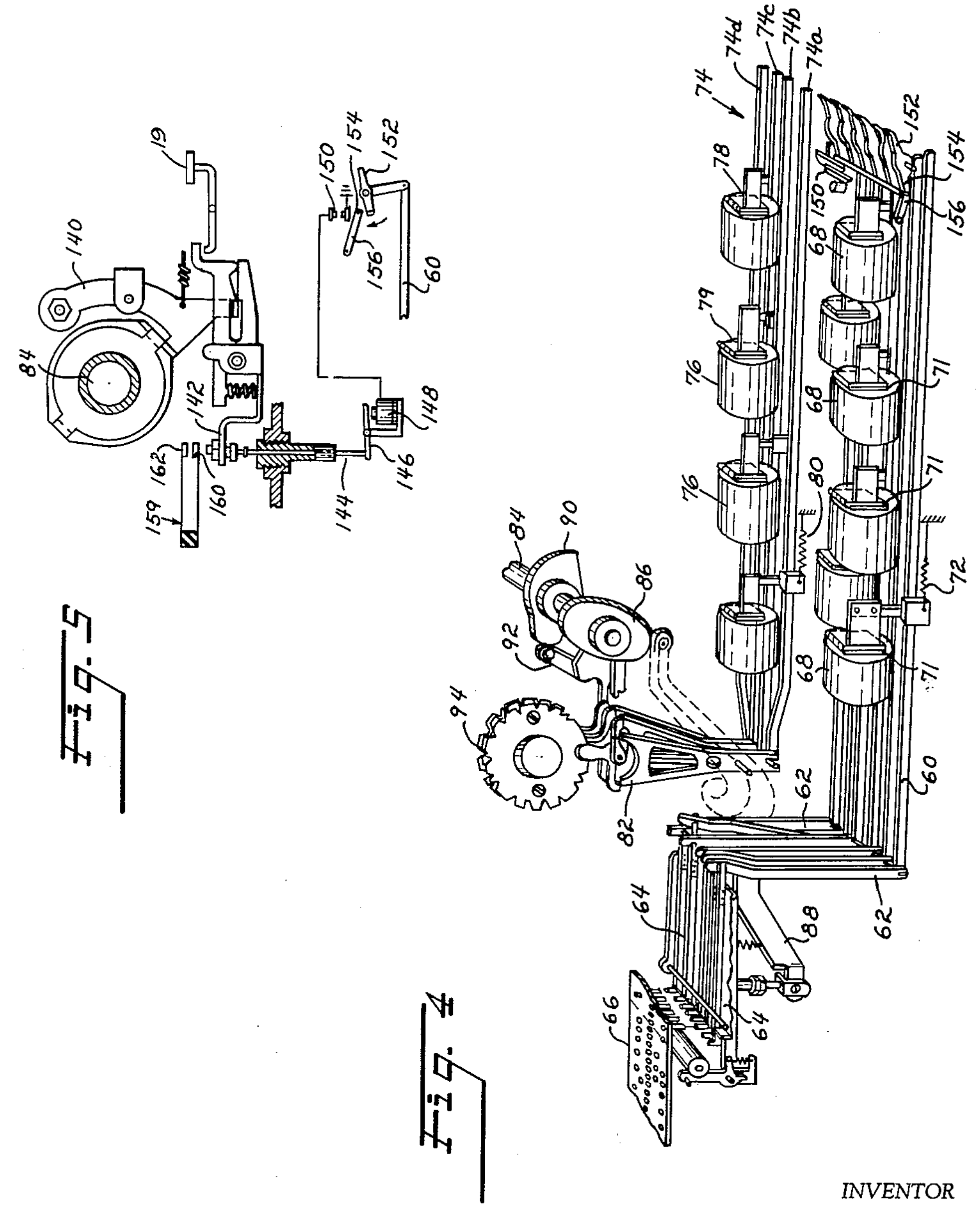
FIG. 4 is a perspective view showing parts of a Teletypesetter machine for operating its punching and counting mechanisms, with the addition of operating devices for such parts as provided by this invention.
FIG. 5 is a sectional view of the main shaft of the Teletypesetter machine, showing the trip-off plunger and its operating means provided by this invention.

In accordance with this invention the selector bar links, punch bar levers and perforating mechanism of the TTS are retained and the usual keys and code bars are eliminated, while electrical means are provided for imparting longitudinal movement to one or more of the selector bar links upon depression of each key of the keyboard 4. FIG. 4 discloses the six selector bar links 60 of the TTS, each of these being mounted for longitudinal movement with respect to its length and each being connected at its one end to the lower end of one of the six pivoted punch bar levers 62. The upper ends of the punch bar levers are connected to the ends of punch bars 64 which form part of the TTS mechanism for producing characteristic perforations in the tape 66. A solenoid 68 is associated with each of the links 60 and is operatively connected to its associated link by the armature 71 which is preferably constructed and operable as disclosed in my co-pending application Serial No. 644,868, filed March 8, 1957, now Patent No. 2,894,181, for Electromechanical Device and Improved Armature Therefor. A spring 72 is connected between each link 60 and the machine frame and constantly urges the associated link and its connected parts to a position in which the punch mechanism is in nonperforating position and from which these parts are moved to perforating position upon operation of one or more of the selector bar solenoids 68.

In addition to the perforating mechanism the TTS includes mechanism for counting the unit width of each character for which a typesetting perforation has been made and for indicating the total of such widths. This mechanism includes counting selector bars which are selectively moved downwardly by depression of a key of the TTS keyboard and which are connected through levers to counting selector links which are mounted for longitudinal movement with respect to their lengths and to which such movement is imparted upon depression of any key. Each counting selector link of the TTS is connected at its one end to the lower end of a counting selector lever which in turn, forms part of the mechanism of the TTS for counting and totaling the unit width of each character for which a tape perforation is made. The counting selector bars, links and levers and their associated mechanism are conventional in the standard TTS, they are well known to the art, they are described and illustrated in certain of the Letters Patent referred to above (see, for example, Nos. 2,069,240 and 2,189,545) and their construction and mode of operation, except as modified by this invention, do not require further description in this specification.

In accordance with this invention the counting selector links, the counting selector levers and the mechanism operated thereby, all of which are conventional parts of the TTS, are retained, the keys and counting selector bars of the TTS are eliminated, and electrical means are provided for imparting longitudinal movement to the counting selector links. Thus, as shown in FIG. 4, each of the four counting selector links 74 of the standard TTS has associated with it a solenoid 76 which is operatively connected to its associated link by the armature 79 which is constructed and operable as disclosed in the co-pending application referred to above. A spring 80 is connected between each link 74 and the machine frame and constantly urges the link and the associated counting selector lever 82 and counting mechanism to a position from which they may perform the counting and totaling function upon operation of one or more of the counting selector solenoids 76.

In addition to the tape perforating mechanism and the counting mechanism which are described above the TTS includes means for imparting movement to the operating parts of the machine and for causing such parts to operate in the proper sequence and these means comprise a shaft 84, which is known as the main shaft, and a part of which is geared to the armature of an electric motor so that such part is constantly rotated during operation of the machine, while a second part is normally held from rotation. This shaft is shown in full in FIG. 9 and is also shown in other figures. A cam 86 is mounted on the part of the main shaft which is not constantly rotated and engages one end of a lever 88 the other end of which operates the punch block. The same part of the shaft also carries a second cam 90 which operates the counting mechanism through a lever 92 which engages the cam surface, a part of the counting mechanism of the standard TTS being shown at 82 and 94. The main shaft and the mechanism associated with it for perforating the tape and counting and totaling the unit widths of each character represented by a tape perforation are conventional in the standard TTS, they are well known in the art, they are described in certain of the Letters Patent referred to above (see, for example, No. 2,069,240) and their construction and mode of operation, except as modified by this invention, do not require further description in this specification.

In accordance with this invention the main shaft of the TTS is modified by the addition thereto of two cams 100, 102 which are rigidly mounted on the shaft between the cams 86, 90. Cam 100 has a generally circular periphery 104 having two diametrically-opposed risers 106. A roller 108 rides on the surface of cam 100 and is supported on the end of a pivoted arm 109 which is connected to ground. On the upper surface of arm 109 is mounted a contact member 110 which forms part of a switch 112 which is normally open and is closed when the roller 108 is engaged by one of the cam risers 106.

The cam risers 106 are diametrically opposite each other and are of equal length and each follows one of the two punch operating parts of the cam 86. The roller 108 is therefore on a riser, and the switch 112 closed, shortly after the completion of any tape perforation, including a shift or unshift perforation. This may be observed from the relation between the positions of the cam risers 106 and the punch cam 86 in FIGS. 10A and 10B.

Cam 102 has a generally circular periphery 120 having two diametrically opposed risers 122. A roller 124 rides on the surface of this cam and is supported on the ends of two pivoted arms which are insulated from each other and which support on their upper surfaces, respectively, the contact members 125, 126 of two switches 127, 128, the other contact members of these switches being shown at 129 and 130. The parts are so arranged that when roller 124 is on the circular, or lower, part 120 of cam 102 switches 127, 128 are open and when the roller is on either of the risers 122 these switches are closed. Each of the two risers 122 follows one of the two operating parts of the punch cam 86 and neither of the risers engages roller 124 until the punch cam has pushed one or more of the punches through the tape, this relation of the parts being shown in FIGS. 11A and 11B. The switches 127, 128 are in circuits which include relay and other coils and the cam risers 122 are therefore of such length that these circuits are maintained for a period of time sufficient to permit the coils to fully charge. The cams 100, 102 and the switches which they operate control the sequence of operation of the means provided by the invention for controlling and operating the tape perforating and unit counting mechanism of the TTS, and the control circuits in which all of the switches are included will be fully described in this specification.

In the standard TTS a part of the main shaft rotates constantly while a second part, which is operatively connected to the tape perforating mechanism and the unit width counting mechanism, is rotated, with consequent operation of these mechanisms, only when a key of the TTS keyboard is depressed. As shown in FIG. 5 this second part of the main shaft is normally held from rotation by a latch means 140 which is connected through suitable linkage to a lever 142 which, when operated, releases the latch to permit the second part of the main shaft to be rotated. In the TTS the lever 142 is operated by a rod known as the trip-off plunger 144 which, when raised, operates the lever and its associated mechanism to release the latch. In the TTS this trip-off plunger is raised by the arm of a lever which is operatively associated with the selector bar links 60 and is operated when any one or more of such links is moved longitudinally by depression of a key of the TTS keyboard. The construction and mode of operation of the main shaft and its operative relation and connection to the tape perforating and unit counting mechanism and the means, including the trip-off plunger, for rotating the second part of the main shaft are conventional in the standard TTS, they are well known in the art, they are disclosed in certain of the Letters Patent referred to above (see, for example, No. 2,019,505) and, except as they are modified by this invention, they need not be further described in this specification.

In accordance with this invention the usual mechanism of the TTS for raising the trip-off plunger 144 upon operation of a key is eliminated and one end of the pivoted armature 146 of a solenoid 148 is positioned beneath the plunger so that when the solenoid is energized the plunger will be raised with consequent operation of the second part of the main shaft, as described above. The trip-off plunger 144, solenoid 148 and armature 146 are shown in FIG. 5. This solenoid is included in a circuit which is opened and closed by a switch 150 which is shown in FIGS. 4, 5, and 8 and which is normally open but is closed by movement of one or more of the selector bar links 60 in effecting a perforating operation. As shown in FIGS. 4 and 5 each of these links is connected at its one end to one arm of a lever 152, a second arm of which lies under a rod 154 which is supported on the ends of pivoted arms 156. The rod 154 is positioned beneath a movable contact of the switch 150 and it will be seen that upon operation of any one or more of the selector bar links 60 the switch 150 will be closed, energizing the solenoid 148, lifting the trip-off plunger and causing the second part of the main shaft to be rotated. The relation of these parts to the entire operation of the machine and the control system provided by this invention are described hereafter in this specification.

A contact stack 159 consisting of two normally spaced contact members 160, 162 is positioned above the trip-off plunger 144 and these contacts are moved into engagement upon upward movement of the trip-off plunger. Contact 160 is connected to the source of power by lead 163 and contact 162 is connected by lead 164 to the release magnet coils of the shift relay, the unshift relay and all of the character coding relays.

Figure 6:
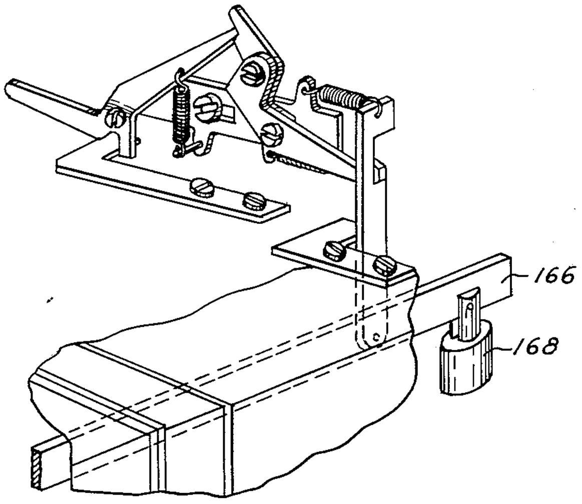
FIG. 6 is a perspective view of the space bar lever mechanism of the Teletypesetter machine, together with the actuating means provided by this invention.

In the TTS there is a space band lever which has a key on its end for operation by the finger and which, when so operated, imparts movement to a linkage which produces a tape perforation which causes the typesetting machine to set a space band and also operates the justification pointers of the counting mechanism. These parts of the TTS and their mode of operation are conventional in the standard TTS, they are well known in the art, they are described and illustrated in certain of the Letters Patent referred to above (see, for example, No. 2,189,545) and their construction and mode of operation, except as modified by this invention, need not be described further in this specification. Parts of this mechanism are illustrated in FIG. 1 of the drawings, in which the space bar 18 is shown and in FIGS. 6 and 8 in which there is shown the space band lever 166 and a solenoid 168, the plunger of which is connected to the space band lever to operate the same, thus eliminating manual operation. The relation of the space band lever and its operating means to the complete control system for the machine are described hereafter in this specification.

Figure 7:
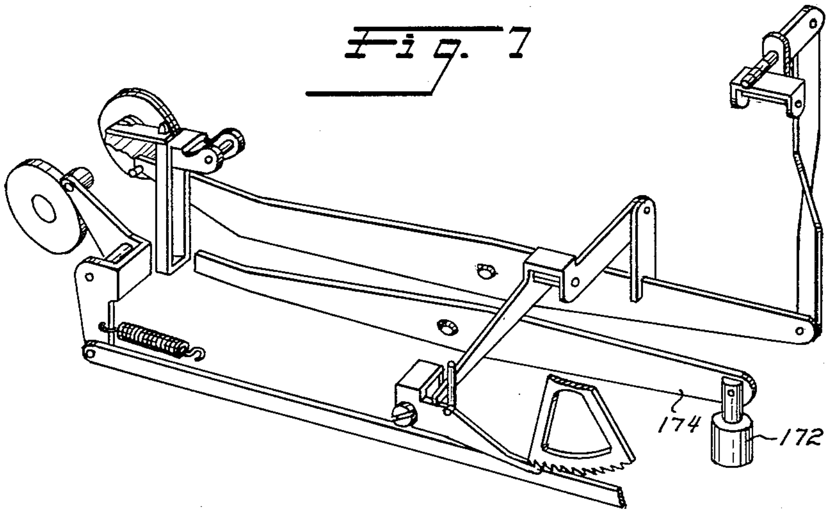
FIG. 7 is a perspective view of the return lever mechanism of the Teletypesetter machine, together with the actuating means provided by this invention.

In the TTS there is also a return key lever which has a key on its end for operation by the finger and which, when so operated, imparts movement to a linkage which produces a tape perforation which causes the typesetting machine to perform an operation and also returns the counting mechanism and indicators and justification pointers of the TTS to their starting positions. These parts and their mode of operation are conventional in the standard TTS, they are well known in the art, they are described and illustrated in certain of the Letters Patent referred to above (see, for example, No. 2,069,240) and, except as modified by this invention, their construction and mode of operation need not be further described in this specification. Parts of this mechanism are illustrated in FIG. 1 of the drawings, in which there is shown the return key 20, and in FIGS. 7 and 8 wherein there are shown the solenoid 172, the plunger of which is connected to the return lever 174 which in the standard TTS is directly operated by a key, thus eliminating manual operation and permitting the return mechanism to be tied into the control system for the entire machine.

By this invention there is provided an electrical control system for energizing and controlling the operation of the various electrical and other operating devices which are described above, and this system is particularly disclosed in FIG. 8 of the drawings, which is made up of sections designated as FIGS. 8A, 8B and 8C. In this figure there are shown, in representative form, the punch bar levers 62, the selector bar links 60, the operating solenoids 68 for the punch bar levers, two of the counting selector links 74 and their operating solenoids 76, the cam 100 and the switch 112 which it operates, the cam 102 and the switches, 127, 128 which it operates, the upper case "B" key 12, which, with the control means which it operates, is representative of all of the upper case character keys of the keyboard 4, the lower case "b" key 14 which, with the control means which it operates, is representative of all of the lower case character keys of the keyboard 4, the comma key 16 which, with the control means which it operates, is representative of all of the no-shift keys of the keyboard 4, the space bar 18, the space band lever 166 and its operating solenoid 168, the return key 20, the return actuating lever 174 and its operating solenoid 172, the trip-off plunger 144 and its actuating solenoid 148, and the tape key 22.

The upper case "B" character key 12 has two contacts 40, 42 associated with it which are successively engaged by a grounded part of the key as the key is depressed. The first contact 40 is connected to one contact of switch 180 of a latching relay 182 which is known as the shift and unshift circuit presetting relay and which has two switches 180, 184 and is so operable that when one switch is open the other is closed, it being understood that this relay itself is a standard commercial article of manufacture. The second contact of switch 180 is connected to the ground terminal of the operating coil 186 of a latching relay 188 which is known as the shift coding relay and is also connected to the ground terminal of one operating coil of a circuit breaker 189. The other terminals of the shift coding relay and the circuit breaker coil are connected to the source of power as indicated by the plus legend thereon. The second contact 42 which is grounded upon depression of key 12 is connected to the ground terminal of the operating coil 187 of a latching relay 190 which is known as a character coding relay and which is the relay controlling the circuits for the letter "B" in either upper case or lower case, it being noted here that the second contact which is grounded upon depression of the lower case "b" key 14 is also connected to the ground terminal of the operating coil 187 of relay 190. The code for the letter "B," in either upper case or lower case, is produced by operating punch bar levers 1, 4, and 5 to perforating positions and the latching relay 190 therefore has three switches 192, 194 and 196 one contact of each of which is connected, respectively, to the operating solenoids 68 for the first, fourth and fifth selector bar links 60. In addition to the three described switches, the latching relay 190 includes a fourth switch 200 one contact of which is connected through lead 202 to the counting circuit operating means as will be fully described hereinafter. In addition, the latching relay 190 includes a fifth switch 204, one contact of which is connected to the ground terminal of the operating coil of the latch release magnet 206 of the latching relay 190.

The second, or power, terminal of the operating coil 187 of relay 190 is connected to a source of electric energy at 210 through lead 212. The latching relay 190 is a standard commercial item and in itself forms no part of this invention. When its operating coil is energized the relay switches are closed and their contacts grounded and the latch mechanism of the relay operates to latch the switches in closed position. When the release magnet is energized and the operating coil de-energized the latch releases the switch members of the relay and the switches are opened by spring means.

The connections between the character coding switches of all of the character coding relays, such as relay 190, and the operating solenoids for the selector bar links 60 are made through switches controlled by a circuit breaker 189 and are only completed when the circuit breaker is deenergized. The circuit breaker has six switches 220, 222, 224, 226, 228 and 230 which, respectively, control the connections between operating solenoids 68 of the punch bar levers 62 and the switches of the character coding relays of all of the character keys of the keyboard 4, and when the circuit breaker is energized the connections between the switches of all character coding relays and the operating solenoids 68 are broken. The circuit breaker has a seventh switch 232 one contact of which is connected to the source of power at 210, and the second contact of which is connected through lead 234 to one terminal of the operating coil of each counting relay, the function and operation of which will be described fully in this specification, thereby to connect these relays to power when the circuit breaker switches are closed. The circuit breaker has an eighth switch 235, one contact of which is connected to the ground terminal of the release magnet coil 236 of the circuit breaker 189, the other switch contact being connected by lead 237 to contact 111 of switch 112 which is operated by cam 100, as described above, and the second contact 110 of which is connected to ground.

The shift coding relay 188 is a latching relay of the same type as relay 190 and has operating coil 186 and latch release magnet 240. The shift code is made by perforating the tape with the punches controlled by punch bar levers 1, 2, 4 and 5 and therefore the relay 188 has four switches 242, 244, 246 and 248, one contact of each of which is connected, respectively, to the operating solenoids for the first, second, fourth and fifth punch bar levers. In addition, this relay has a fifth switch 250, one contact of which is connected to the ground terminal of the latch release magnet 240 of the relay 188. The power terminal of the release magnet 240 is connected to contact 162 of the contact stack 159 which stack, as described, is operated by the trip-off plunger 144. In addition the relay 188 has a sixth switch 252, one contact of which is connected to one contact 125 of switch 127 which, as described hereinbefore, is operated by cam 102 on the main shaft of the TTS. The second contact 129 of switch 127 is connected to the operating coil 255 of the shift and unshift circuit pre-setting relay 182 which operates the switch 184 which forms part of that relay. In addition, the relay 188 has a seventh switch 254, one contact of which is grounded and the other of which is connected by lead 256 to the ground terminal of the operating coil 257 of the counting selector relay 258, the operation and function of which will be described fully hereinafter. When the switches of the relay 188 are closed the contacts thereof are connected to ground.

The first contact member 50 which is engaged and grounded upon depression of the lower case "b" key 14 is connected to one contact of switch 184 of the shift and unshift circuit pre-setting relay 182, the other contact of this switch being connected to the ground terminal of the operating coil 260 of a latching relay 262 which is known as the unshift coding relay and which is a standard commercial article preferably of the same type as the latching relays which have been described. The second terminal of the operating coil 260 is connected to the source of power, as indicated. The unshift code is made by perforating the tape with the punches controlled by punch bar levers 1, 2, 3, 4 and 5 and therefore the relay 262 has five switches 264, 266, 268, 270 and 272 one contact of each of which is connected, respectively, to the operating solenoids for the first, second, third, fourth and fifth punch bar levers. In addition, the relay has a sixth switch 274, one contact of which is connected to the ground terminal of the latch release magnet 276 of the relay 262, the other terminal of the magnet being connected to contact 162 of the contact stack 159 which stack, as described, is operated by the trip-off plunger 144. In addition, the relay 262 has a seventh switch 278, one terminal of which is connected to contact 130 of switch 128 which, as described, is operated by cam 102 on the main operating shaft of the TTS. The second contact 126 of switch 128 is connected to the operating coil 280 of the shift and unshift circuit pre-setting relay 182 which operates the switch 180 which forms part of that relay. In addition, the relay 262 has an eighth switch 282, one terminal of which is connected through lead 283 to the ground terminal of the release coil 284 of the counting selector relay 258. When the relay 262 is operated all of the switch contacts forming part of it are connected to ground.

The comma key 16 of the keyboard 4, when operated, connects a single contact member 56 to ground. This contact member is connected to the ground terminal of the operating coil 290 of a latching relay 292 which is of the same type as those described hereinbefore. The characteristic comma perforation is made by operating the zero, third and fourth punch bar levers and the relay 292 therefore has three switches 294, 296 and 298, one contact of each of which is connected to one of the operating solenoids of the zero, third and fourth punch bar levers through switches 220, 226 and 228 of the circuit breaker 189.

The space bar 18 of the keyboard 4, when operated, grounds a contact member 310 which is connected to the ground terminal of the operating coil 312 of a latching relay 314 which is of the same type as those described hereinbefore. The characteristic space perforation is made by operating the third punch bar lever and the relay 314 therefore has a switch 316, one contact of which is connected to the operating solenoid of the third punch bar lever 62 through switch 226 of the circuit breaker 189. In addition, the relay 314 has a second switch 318 one contact of which is connected to the ground terminal of the latch release magnet 320 of the relay 314. In addition, the relay 314 has a third switch 322, one contact of which is connected to one terminal of the operating coil of the solenoid 168, the plunger of which operates the space band lever 166 of the TTS, the other terminal of this operating coil being connected to the source of power as indicated in the drawings. When the relay 314 is energized the switch contact members thereof are connected to ground.

The repeat key 19, when depressed, operates a mechanical means to hold the latch 140 (FIG. 5) out of latching engagement with the main shaft. Thus, if a character key is depressed and held down, the solenoids 68 operated by the key will remain operative so long as the key is depressed, holding the punches in punching position. If, while holding the character key depressed, repeat key 19 is also depressed, latch 140 will be moved out of engagement with the main shaft 84 and the shaft will therefore continue to rotate until the repeat key or the character key is released. So long as both keys are held depressed, the punches corresponding to the character key will be operated, producing a succession of the same characteristic punches.

The return key 20 of the keyboard 4, when operated, connects two contact members 330, 331 to ground. The first contact member 330 is connected by lead 376 to the ground terminal of the release magnet 329 of the upper-lower rail light operating relay 356 which is fully described hereinafter. The second contact member 331 is connected to the ground terminal of the operating coil 332 of a latching relay 334 which is of the same type as those described hereinbefore. The characteristic return perforation is made by operating the fourth punch bar lever and the relay 334 therefore has a switch 336, one contact of which is connected to the operating solenoid of the fourth punch bar lever 62 through switch 228 of the circuit breaker. In addition, the relay 334 has a second switch 338, one contact of which is connected to the ground terminal of the latch release magnet 340 of the relay 334. In addition, the relay 334 has a third switch 342, one contact of which is connected to one terminal of the operating coil of the solenoid 172 which operates the return actuating lever 174 of the TTS, the other terminal of this operating coil being connected to the source of power as indicated. When the relay 334 is energized the switch contact members thereof are closed and connected to ground.

Each matrix of the Linotype machine has on it an upper and a lower character. For example, it is common practise to have on each matrix an upper character in light face and lower character in bold face. In the operation of a Linotype machine these upper and lower characters are selected by the selective operation of an upper rail and a lower rail, and these, in turn, are selectively operated by characteristic upper rail and lower rail perforations in the tape produced by the TTS. The keyboard of the machine provided by this invention includes an upper rail key 23 and a lower rail key 25 which, when operated, cause the operation of mechanism which produces, respectively, the characteristic upper rail tape perforation and the characteristic lower rail tape perforation. A signal light 364, known as the "upper rail light," is provided and is energized upon depression of the upper rail key 23. This light is extinguished upon depression of the lower rail key to indicate lower rail operation of the Linotype machine.

The upper rail key 23 of the keyboard 4, when operated, successively connects two contact members 350, 352 to ground. The first contact member 350 is connected to the ground terminal of the operating coil 354 of a latching relay 356 which is of the same type as those described hereinbefore, and the second contact member 352 is connected to the ground terminal of the operating coil of a coding relay 360 which is also of the same type as the character coding latching relays described hereinbefore. The relay 356 has one switch 362 and when the relay is energized this switch is closed to complete a circuit through the upper rail light 364. The characteristic upper rail perforation is made by operating the zero, first, fourth and fifth punch bar levers 62 and the relay 360, when operated by depression of the upper rail key 23, causes operation of the zero, first, fourth and fifth punch bar levers 62 in the manner described hereinbefore in connection with the operation of the character coding and other relays.

The lower rail key 25 of the keyboard 4, when operated, successively connects two contact members 370, 372 to ground. The first contact member 370 is connected to the ground terminal of the release magnet 329 of the latching relay 356, and the second contact member 372 is connected to the operating coil of a coding relay 374 which is of the same type as the character coding latching relays described hereinbefore. The characteristic lower rail perforation is made by operating the zero, first, second, fourth and fifth punch bar levers 62 and the relay 374, when operated by depression of the lower rail key 25, causes operation of the zero, first, second, fourth and fifth punch bar levers 62 in the manner described hereinbefore in connection with the operation of the character coding and other relays. The second terminals of the operating coil 354 and of the release magnet 329 of relay 356 are connected to the source of power, as shown.

In the operation of a Linotype machine the matrices are selected and positioned until completion of a line in the assembly elevator, after which the operator manually raises the elevator to start the casting cycle of the machine. In the operation of the TTS a characteristic "elevate" tape perforation is produced which causes this elevating operation to be performed by the Linotype machine.

A shift key 390 is provided on the keyboard 4 and has associated with it a normally open switch 392 one contact of which is connected to the ground terminal of the operating coil 186 of the shift coding relay 188 whereby the terminal is connected to ground upon depression of the key. The keyboard also includes an unshift key 396 which has associated with it a normally open switch 398 one contact of which is connected to the ground terminal of the operating coil 260 of the unshift coding relay 262 whereby the terminal is connected to ground upon depression of the key. These separate shift and unshift keys and their operating connections are provided to permit the operator to produce a characteristic shift or unshift perforation at any time, this being particularly useful when it is necessary to produce perforations required to re-set a line of type and it is not known whether the last previous tape perforation followed a shift or unshift characteristic perforation.

A switch 399 is provided which controls the connection between all of the upper and lower case keys, such as keys 12 and 14, and the switches 180 and 184 of the shift and unshift circuit pre-setting relay 182. If switch 399 is closed the shift and unshift coding relays are included in the circuits for normal automatic operation, as described herein, and a characteristic shift or unshift perforation will be automatically produced upon operation of any upper case or lower case key. If switch 399 is open the shift and unshift coding relays are cut out of the circuit and the separate shift and unshift keys 390, 396, must be operated whenever it is desired to produce a characteristic shift or unshift perforation.

The "shift" and "unshift" operations of the TTS to cause operation of the Linotype machine to set and cast upper case or lower case have already been described in this specification. The keyboard of the machine provided by this invention includes shift and unshift keys which, when operated, cause the TTS tape to be perforated with the characteristic shift and unshift perforations, respectively.

In addition to the means described above for causing tape perforation upon operation of any of the keys of the keyboard 4, the invention includes means for operating the counting mechanism of the TTS upon depression of any character key of the keyboard 4. From the foregoing description it will be seen that one character coding relay is provided for the upper and lower case keys of each letter or other character. Thus, the latching relay 190 is operated upon depression of either the upper case "B" key or the lower case "b" key of the keyboard. It will be understood, however, that the printed upper case "B" and the printed lower case "b" have different unit widths, as have the upper and lower cases of all characters. The means provided by the invention for counting the unit widths of the upper case "B" and the lower case "b" upon depression of either of these keys will now be described and it will be understood that similar circuits and operating means are provided for all character keys although, in order to simplify the drawings and specification, all of these are not illustrated or described.

The means provided by the invention for counting the unit width of the upper case letter "B" or the lower case letter "b" upon depression of either of these keys, which are keys 12, 14 of the keyboard 4, are shown in FIG. 8. As described above and as illustrated in FIG. 4, there are four counting selector links 74 in the TTS. The second and third links are moved to operate the counting mechanism to count the width of the upper case letter "B" and the third link is moved alone to operate the same mechanism to count the width of the lower case letter "b." The first two links are shown as part of the counting means in FIG. 8 and are designated 74*b* and 74*c*. Link 74*b* is connected to the plunger of solenoid 76*b* and link 74*c* is connected to the plunger of solenoid 76*c*. One terminal of the operating coil of each of these solenoids is connected to the source of power, as shown, and each of the other terminals is connected to one of the contact members of two switches 402, 404 which form part of relay 406. The operating coil of solenoid 76*c* is also connected to one terminal of the single switch 408 of a second relay 410. One terminal of the operating coil of each of the relays 406, 410 is connected to the source of power through lead 234, switch 232 of the circuit breaker 189, as described, and the second terminal of each of these operating coils is connected, respectively, through leads 420, 422 to one of the two contact members of a single-pole, double-throw switch 424, the movable contact member of which is connected by lead 202 to one contact of switch 200 of the character coding relay 190 which is energized upon depression of either of keys 12, 14 which are, respectively, the upper case "B" key and the lower case "b" key. The armature of counting selector relay 258 is operatively connected to the movable contact member of switch 424, as indicated at 425 and, when energized and latched, moves and holds such movable contact member to a position connecting lead 202 to lead 420 and the operating coil of relay 406 and when unlatched causes the movable contact member to connect lead 202 to lead 422 and the operating coil of relay 410. It will be seen that in the former case solenoids 76*b* and 76*c* will be energized and in the latter case only solenoid 76*c* will be energized, thus selectively operating counting selector links 74*b* and 74*c* or link 74*c* alone, thus counting the proper number of unit widths for the upper case letter "B" or lower case letter "b."

The upper cases of the letters A, B, P, Q and V all have the same unit width and the lower cases of these letters have the same unit width. Each character coding relay for these letter keys therefore includes a switch corresponding to switch 200 of the "B," "b" relay 190 for energizing the counting relay means upon depression of any of these keys.

Each of the various characters which may be set by the typesetting machine has known unit widths for its upper and lower cases and those having the same unit widths are grouped in the same way as the letters A, B, P, Q and V as described above. Thus the upper case R has a width of 15 units and the lower case r has a width of 9 units. No other character has this same combination of unit widths in upper and lower case and, as shown at 450, the character coding relay of the upper case R and the lower case r keys is connected, through a switch corresponding in structure and operation to switch 200 of relay 190, to the movable contact of a single-pole, double-throw switch 452 which is operated by the counting selector relay 258 to be connected to lead 454 or 456 which, respectively, are connected to counting relays which, when energized, cause a counting selector link, or a pre-determined combination of such links, to be moved to operate the counting mechanism of the TTS in a known manner.

As a further example, the upper cases of the letters D, G, H, U, X, Y, K and N have the same unit width and the lower cases of these letters have the same unit width. The character coding relay for each of these letters includes a switch corresponding to switch 200 of relay 190 and one contact of each of these switches is connected to the movable contact of a single-pole, double-throw switch 460 which is operable by the counting s lector relay 258 to energize the proper counting relay or relays to operate the counting selector link, or combination of such links, upon operation of the upper case key or the lower case key of any of these letters.

The operation of the counting mechanism of the TTS causes a counting pointer 461 to be moved across scale 462 in a direction to the right as viewed by the operator and as shown in FIG. 1. When this pointer reaches the zero mark on the scale 462 the operator knows that the line is finished and justified. In accordance with the invention an electrical contact member 464 is mounted on the counting pointer and a second contact member 466 is mounted on the scale 462 in a position to be engaged by the contact 464 if and when the counting pointer 460 moves beyond the zero mark on the scale 462. When the contacts are engaged a circuit is completed through an overset light 468, lighting the same to indicate to the operator that the line has been overset.

*Operation*

The operation of parts of a tape perforating and unit counting machine and the operating devices and control system provided by this invention will now be described by describing a full sequence of operation.

With the normally rotating part of the main shaft of the machine rotating, the machine is prepared to operate upon depression of any key. At this time all of the relays are de-energized, the cams 100 and 102 are stationary, cam 100 is in the position shown in FIG. 10A, cam 102 is in the position shown in FIG. 11A, the switch 112 is in the condition shown in FIG. 10A and the switches 127, 128 are in the conditions shown in FIG. 11A.

If the upper case "B" letter key 12 is depressed current flows from key contact 40 through switch 180 of the shift and unshift circuit pre-setting relay 182 to the operating coil 186 of the shift coding relay 188, operating relay 188, closing the switches and latching the relay in closed position. At the same time current flows to the operating coil 189*a* of the circuit breaker 189 energizing the same and opening the switches 220 to 232, thereby preventing connection of the character switch contacts of the character coding relay 190 to the operating solenoids of the punch bar levers. Operation of the circuit breaker also closes switch 235 connecting the ground terminal of the circuit breaker release magnet 236 to switch contact 111 so that when switch 112 is closed by a riser on cam 100 the circuit breaker release magnet will be energized. The risers 106 on cam 100 follow the operating parts of the punch cam 86 and as soon as the shift or unshift perforation is made the switch 112 will be closed, the circuit breaker release magnet will be energized, and the circuit breaker latch will be released, thus closing the circuit breaker switches 220 to 232 to permit immediate operation of the selector bar links, punch levers and punches by the operated character coding relay. However, until a riser on cam 100 closes switch 112 which, as stated, can occur only after the shift or unshift perforation is completed, the character perforation cannot be performed. Closing of switches 242 to 248 of the shift coding relay 188 completes circuits through the operating solenoids 68 of the first, second, fourth and fifth punch bar levers, moving the associated selector bar links 60 to operate the connected punch bar levers and set the corresponding punches in position to perforate the tape. This movement of the selector bar links closes the switch 150, energizing solenoid 148 to raise the trip-off plunger 144, thus causing the cam part of the main shaft of the machine to be rotated. Punch cam 86 will thereupon operate lever 88 to actuate the punches and perforate the tape with the characteristic shift perforation. As relay 188 is energized a circuit will be completed through switch 250, the latch release magnet 240 of the same relay, and switch stack 159, which has been closed by operation of the trip-off plunger, thus tending to withdraw the latch from latching position. However, it will be seen that the sequence of operation, namely operating of the shift coding relay, energization of the selector bar lever operating solenoids, closing of switch 150, operation of the trip-off plunger, rotation of the shaft 84, and operation of the punch cam 86 will occupy appreciable time, of which the punch operation will be only a small part because of the high speed of rotation of shaft 84. The shift punching operation will therefore be fully completed before the shift coding relay release magnet is energized and the relay latch released.

As the main shaft rotates, cam 102 moves to the position shown in FIG. 11B and one of its risers 122 closes switches 127, 128, completing a circuit from ground through switch 252 of the shift coding relay 188, switch 127 and the unshift operating coil 255 of the shift and unshift circuit pre-setting relay 182, energizing this coil to close switch 184 and open switch 180. Closing of switch 184 pre-sets the circuit for any subsequent operation of an unshift, or lower case, key. Opening of switch 180 de-energizes the operating coil of shift code relay 188 causing its switches to open, and also de-energizes the operating coil of the circuit breaker 189, closing the switches which it controls.

The opening of switches 242 to 248 of the shift coding relay 188 de-energizes the connected operating coils of the solenoids actuating the selector bar links and punch bar levers, thus causing these parts to be returned to normal positions by springs 72. When this occurs, the switch 150 will be opened, de-energizing the operating solenoid 148 of the trip-off plunger, returning this plunger to its inoperative, lower position to permit the latch mechanism shown in FIG. 5 to again become operative to hold the cam part of the main shaft stationary. The full depression of "B" key 12 connects the second key contact 42 to ground, completing a circuit through the operating coil of character coding relay 190 and closing its switches. When this occurs circuits are completed through relay switches 192, 194 and 196, switches 222, 228 and 230 of the circuit breaker and the operating coils of the first, fourth and fifth punch bar solenoids. The corresponding selector bar links will be moved, operating the connected punch bar levers to set the proper punches in place to produce the characteristic "B" letter perforation. The operation of the punch bar levers to produce the letter perforation will close switch 150, energizing the operating solenoid 148 of the trip-off plunger 144 to raise the plunger and release the latch mechanism holding the cam part of the main shaft. The cam part of the shaft will be rotated and the punch lever 88 will be operated to punch the characteristic "B" letter perforation in the tape. Operation of the trip-off plunger will close switch 159 causing a circuit to be completed through the winding of the release magnet 206 of the character coding relay 190. The relay latch will therefore be released and the relay switches will be opened, thus de-energizing the operating solenoids of the selector bar links. However, the circuit through the release magnet cannot be completed until the trip-off plunger has operated and the delay is sufficient to permit complete operation of the punching mechanism before release of the latch, even though the depressed key is immediately released after operation. Release of the letter key 12 will open all circuits and re-set the main shaft latching means thereby holding the parts in position for subsequent operation of any key.

After operation of any upper case key, such as key 12, subsequent operation of any upper case key will be ineffective to operate the shift coding relay 188 as the switch 180 of the shift and unshift circuit pre-setting relay 182 was opened as a result of first operation of an upper case key and this switch is included in the circuit of the operating coil of the shift coding relay. Therefore, any such subsequent operation of an upper case key will be effective only to operate the associated character coding relay to cause punching of the characteristic tape perforation corresponding to the operated key in the manner described above, and also to operate the counting mechanism.

If a lower case key, such as the "b" letter key 14, is depressed after operation of one or more upper case keys the following operations take place. Before depression of the key all of the relays are de-energized and the cam part of the main shaft is stationary, cam 100 is in the position shown in FIG. 10A, cam 102 is in the position shown in FIG. 11A, and the switches 112, 127 and 128 are in the conditions shown in FIGS. 10A and 11A, respectively.

When the lower case "b" letter key 14 is depressed current flows from key contact 50 through switch 184 of the shift and unshift circuit pre-setting relay 182 to the operating coil of the unshift coding relay 262, operating the relay, closing its switches and latching the relay in closed position. At the same time current flows to the operating coil of the circuit breaker 189 energizing the same and opening the switches 220 to 232, thereby preventing connection of the switch contacts of the character coding relay 190 to the operating solenoids of the punch bar levers. Closing of switches 264 to 272 of the unshift coding relay 262 will complete circuits through the operating solenoids of the first, second, third, fourth and fifth punch bar levers, moving the associated selector bar links 60 to operate the connected punch bar levers and set the corresponding punches in position to perforate the tape. This movement of the selector bar links closes the switch 150, energizing solenoid 148 to raise the trip-off plunger 144, thus causing the cam part of the main shaft of the machine to be rotated. Punch cam 86 will thereupon operate lever 88 to actuate the punches and perforate the tape with the characteristic unshift perforation. As unshift coding relay 262 is energized a circuit will be completed through switch 274, the latch release magnet 276 of the same relay and switch 159, thus withdrawing the latch from latching position. The unshift coding relay is thereupon de-energized and its switches opened. The operating solenoids for the selector bar links are now de-energized and switch 150 is opened, de-energizing solenoid 148 and releasing the trip-off plunger, opening switch 159. A circuit is now completed through the switches of the character coding relay, causing operation of the connected solenoids of the selector bar links to produce the characteristic tape perforation for the depressed key. Rotation of cam 100 during this described operation causes de-energization of the circuit breaker in the manner described above.

As the cam part of the main shaft rotates, cam 102 moves from the position shown in FIG. 11A to that shown in FIG. 11B and one of its risers 122 closes switch 128, completing a circuit from ground through switch 278 of the unshift coding relay 262, switch 128 and the unshift operating coil 280 of the shift and unshift circuit presetting relay 182, energizing this coil to close switch 180 and open switch 184. Closing of switch 180 presets the circuit for any subsequent operation of a shift, or upper case, key. Opening of switch 184 de-energizes the operating coil of unshift coding relay 262 causing its switches to open, and also de-energizes the operating coil of the circuit breaker 189, closing the switches which it controls. The opening of switches 264 to 272 of the unshift coding relay 262 de-energizes the connected operating coils of the solenoids 68 which operate the selector bar links and the punch bar levers, thus causing these parts to be returned to normal positions by springs 72. When this occurs, the switch 150 will be opened, de-energizing the operating solenoid 148 of the trip-off plunger 144, returning this plunger to its inoperative, lower position to permit the latch mechanism shown in FIG. 5 to again become operative to hold the cam part of the main shaft stationary. The full depression of "b" key 14 connects the second contact 52 to ground, completing a circuit through the operating coil 187 of character coding relay 190 and closing its switches. When this occurs circuits are completed through relay switches 192, 194 and 196, switches 222, 228 and 230 of the circuit breaker and the operating coils of the first, fourth and fifth punch bar solenoids 68. The corresponding selector bar links will be moved, operating the connected punch bar levers to set the proper punches in place to produce the characteristic "b" letter perforation. The operation of the punch bar levers to produce the letter perforation will close switch 150, energizing the operating solenoid 148 of the trip-off plunger 144 to raise the plunger and release the latch mechanism holding the cam part of the main shaft. The cam part of the shaft will be rotated and the punch lever 88 will be operated to punch the charactertistic "b" letter perforation in the tape. Release of the key 14 will open all circuits and reset the main shaft latching means thereby holding the parts in position for subsequent operation of any key.

After operation of any lower case key, such as key 14, subsequent operation of any lower case key will be effective to operate the associated character coding relay to cause punching of the characteristic tape perforation corresponding to the operated key in the manner described above, and also to operate the counting mechanism.

When any character key of the keyboard 4 is depressed, the means provided by the invention for operating the counting mechanism of the TTS is energized. Thus, when the upper case "B" key 12 is depressed, the shift coding relay 188 is first operated as described above and a circuit is completed through switch 254 of that relay and lead 256 to the operating coil 257 of the counting selector relay 258, which is thereupon operated to move the movable contact of the single-pole, double-throw switch 424 (and all corresponding switches such as switches 452 and 460) to the "shift" or upper case position in which lead 202 is connected to lead 420. Upon operation of the character coding relay 190 in the manner described above, a circuit will be completed through switch 200 of that relay, lead 202 and lead 420 to the operating coil of the counting selector relay 406, operating the relay to close its switches 402, 404, thus energizing the solenoids **76*b* and 76*c* and imparting movement to the counting selector links 74*b* and 74*c*. As described hereinbefore, and as is well known in the construction and operation of the TTS, such movement of the links operates the counting mechanism of the TTS to indicate the unit width of the upper case letter "B." Upon release of the key 12** the described circuits will be de-energized and the parts which they control and operate will return to their normal positions for operation upon depression of any key.

When the lower case "b" key 14 is depressed the unshift coding relay 262 is first operated as described above and a circuit is completed through switch 282 of that relay and lead 283 to the release coil 284 of the counting selector relay 258, which is operated to release the armature of the relay and move the movable contact of the single-pole, double-throw switch 424 (and all corresponding switches such as switches 452 and 460) to the "unshift" or lower case position in which lead 202 is connected to lead 422. Upon operation of the character coding relay 190 in the manner described above, a circuit will be completed through switch 200 of that relay, lead 202 and lead 422 to the operating coil of the counting selector relay 410, operating the relay to close its switch 408, thus energizing the solenoid **76*c*. As described above, and as is well known in the construction and operation of the TTS, such movement of this link operates the counting mechanism of the TTS to indicate the unit width of the lower case letter "b." Upon release of the key 14** the described circuits well be de-energized and the parts which they control and operate will return to their normal positions for operation upon depression of any key.

Operation of any key of the keyboard 4 which produces a tape perforation which causes the typesetting machine to set and cast a character having a unit width will cause operation of the counting control means provided by the invention in the same manner as described above for the operation of such control means upon depression of the upper case "B" key and the lower case "b" key.

The comma key 16 and the control circuit and operating device associated with it are representative of all of the keys of the keyboard 4 and their associated control circuits and operating devices which, upon depression of the key, cause a tape perforation to be made which causes the typesetting machine to set and cast the same character regardless of whether a shift or an unshift perforation was last made in the tape. Upon operation of the comma key 16 the single contact 56 associated with this key is grounded and a circuit is immediately completed through the operating coil 290 of the comma key latching relay 292, operating the relay and closing its switches. The latching means of the relay will operate and upon closing of switch 301 of the relay the latch release magnet 303 will be energized, tending to release the latch. The magnet is connected to power through switch 159 which is operated by the trip-off plunger 144 and operation of the plunger will close switch 159 causing a circuit to be completed through the winding of the release magnet. The relay latch will therefore be released and the relay switches will be opened, thus de-energizing the operating solenoids of the selector bar links. However, the circuit through the release magnet cannot be completed until the trip-off plunger has operated and the delay is sufficient to permit complete operation of the punching mechanism before release of the latch, even though the depressed key is immediately released. The characteristic tape perforation for a comma is made by operating the zero, third and fourth punches and accordingly switches 294, 296 and 298 of relay 292 are connected to the operating solenoids 68 for the zero, third and fourth selector bar links and when these switches are closed these solenoids will be immediately operated, imparting movement to the selector bar links to move the associated punch bar levers and punches to perforating position. This movement of the punch bar levers will close switch 150, energizing solenoid 148 to raise the trip-off plunger 144 thus causing the cam part of the main shaft of the machine to be rotated. Punch cam 86 will thereupon operate lever 88 to actuate the punches and perforate the tape with the characteristic comma perforation. Closing of switch 300 of relay 292 will complete a circuit through lead 302 to the operating coil 500 of a counting relay 502 which has one switch 504, one terminal of which is connected to the winding of a solenoid 506 the plunger of which is connected to the counting selector link 74*a*. When switch 300 is closed the counting relay 502 will therefore be operated to close switch 504 and energize solenoid winding 506 thereby imparting movement to the counting selector link 74*a* to operate the usual and conventional counting mechanism of the TTS to indicate the unit width of the comma. Release of the comma key 16 will de-energize the described circuits and the control means and devices energized and operated thereby will return to normal position for operation upon subsequent depression of any key.

The space bar 18 has one contact 310 associated with it and when the space bar is depressed this contact member will be grounded completing a circuit through the operating coil 312 of the space bar latching relay 314. The characteristic tape perforation for the space bar is made by operating the third punch and the relay therefore has a switch 316 which is connected directly to the operating solenoid 68 of the third punch bar lever. When relay 314 is operated switch 316 will be closed and the operating solenoid 68 of the third selector bar link 60 will be energized, imparting movement to the link which will move the connected punch bar lever and punch to perforating position. Such movement of the selector bar link will close switch 150 energizing solenoid 148 to raise the trip-off plunger 144 thus causing the cam part of the main shaft of the machine to be rotated. Punch cam 86 will thereupon operate lever 88 to actuate the third punch and perforate the tape with the characteristic space bar perforation. Operation of the space bar relay 314 will also close switch 322 causing the solenoid 168 to be energized to thereby impart movement to the space bar lever 166, thereby operating the justification pointers of the TTS in the conventional and usual mode of operation of the TTS. Operation of the space bar relay 314 will close switch 318, energizing the release magnet 320 of this relay which will tend to move the latch out of latching position. However, the release magnet 320 is connected to power through switch 159 and, as described before, the delay in operation of this switch is sufficient to permit full operation of the punching mechanism, even if the depressed space bar is immediately released. Release of the space bar will de-energize the described circuits thereby causing the described control means and operating devices to return to normal positions for operation upon subsequent depression of any key.

The return key 20 has two contacts 330, 331 associated with it and when this key is depressed and the second contact member is grounded the operating coil 332 of the return key latching relay 334 will be energized, thereby closing the switches of this relay. The characteristic tape perforation for the return operation is made with the fourth punch of the tape perforating mechanism of the TTS. Upon operation of relay 334 switch 336 of the relay will be closed energizing the operating solenoid for the fourth selector bar link 60, imparting movement thereto which moves the connected punch bar lever and punch to perforating position. Such movement of the selector bar link will close switch 150, energizing solenoid 148 to raise the trip-off plunger 144, thus causing the cam part of the main shaft of the machine to be rotated. Punch cam 86 will thereupon operate lever 88 to actuate the fourth punch and perforate the tape with the characteristic perforation for the return operation. As relay 334 is operated a circuit will be completed through switch 338 and the latch release magnet 340 of the relay will tend to withdraw the latch from latching position. However, the release magnet is connected to power through switch 159 and, as described hereinbefore, the operation of this switch is delayed sufficiently to permit full operation of the punching mechanism. Release of the return key 20 will de-energize the described circuits and the parts controlled and operated thereby will return to their normal positions for operation upon any subsequent depression of any key.

When the upper rail key 23 is depressed the first contact 350 is grounded, thereby energizing the operating coil 354 of relay 356, closing the switch 362 which forms part of this relay and energizing the upper rail light 364 to indicate to the operator that the upper rail tape perforation has been made which will cause the typesetting machine to set and cast bold face type. This perforation will be made upon complete depression of the upper rail key and consequent grounding of the second contact 352 which is connected to the operating coil of the coding relay 360.

When the lower rail key 25 is depressed the first contact 370 will be grounded thereby energizing the release magnet 329 of relay 356, thus preventing any energization of the upper rail light 364. Complete depression of the lower rail key 25 will cause the second contact 372 to be grounded, thereby energizing the operating coil of the coding relay 374 which produces the characteristic lower rail tape perforation which will cause the typesetting machine to set and cast light face type. The first contact 330 which is associated with the return key 20, being connected to the release magnet 329 of relay 356, will cause this release magnet to be energized upon any depression of the return key to thereby prevent any energization of the upper rail light.

The tape key 22 has one contact 550 associated with it which is connected to the operating solenoid 148 of the trip-off plunger 144. When the tape key is depressed the solenoid 148 will therefore be energized to raise the trip-off plunger and permit rotation of the cam part of the main shaft of the machine in the manner described above, thereby moving the tape without making any characteristic perforation therein.

Two indicator lights 560 and 562 are provided as shown in FIGS. 1 and 8 and are respectively connected at their terminals to a single-pole, double-throw switch 564 the movable contact of which is connected through resistance 566 to the source of power. The movable contact of the switch 564 is connected to the armature of the counting selector relay 258 and when this relay is operated to move the counting control mechanism to the shift or unshift position one or the other of indicator lights 560, 562 will be energized thereby indicating either shift or unshift operation of the perforating and counting mechanism.

While I have described and illustrated one embodiment of my invention, it will be apparent to those skilled in the art to which the invention relates that other embodiments, as well as modifications of that disclosed, may be made and practised without departing from the spirit or scope of the invention, for the limits of which reference must be made to the appended claims.

What is claimed is:

1. A tape perforating machine for producing a perforated tape used to control a typesetting machine, comprising a keyboard having separate upper case and lower case keys for each letter of the alphabet, a plurality of tape perforating punches, a punch bar associated with each punch and normally removed therefrom but movable into operable relation thereto to permit operation of the associated punch, an electrical device connected to each punch bar to operate the same when energized, a shift coding relay having a plurality of switches each of which is connected to one of a pre-determined combination of said electrical devices to produce when energized a tape perforation which is characteristic of upper case, an unshift coding relay having a plurality of switches each of which is connected to one of a pre-determined combination of said electrical devices to produce when energized a tape perforation which is characteristic of lower case, a character coding relay for each letter of the alphabet, each of said character coding relays having a plurality of switches each having a contact connected to one of a pre-determined combination of said electrical devices which is different for each letter thereby to produce a characteristic tape perforation upon operation of each character coding relay, two contact members associated with each of said keys and positioned to be successively engaged upon depression of the associated key, and means operable on depression of any upper case or lower case key to operate the shift coding relay or the unshift coding relay to cause operation of one or another of the pre-determined combinations of said electrical devices to produce a tape perforation characteristic of the case of the depressed key if the preceding depressed key was of different case, and on further depression to cause operation of another combination of said electrical devices which is characteristic of the letter of the depressed key.

2. A tape perforating machine according to claim 1 comprising, in addition, a plurality of counting selector links forming part of mechanism for indicating the unit width of each letter or character corresponding to a depressed key, an electrical operating device connected to each of said links to operate the same when energized, a normally open switch, a source of electrical energy, a circuit including said electrical operating device and said switch and said source, and means operable upon depression of any of said keys to close said switch to energize said electrical device thereby to operate the connected link.

3. A tape perforating machine according to claim 1 comprising, in addition, a plurality of counting selector links forming part of mechanism for indicating the unit width of each letter or character corresponding to a depressed key, an electrical operating device connected to each of said links to operate the same when energized, a plurality of counting relays each having one or more switches each connected to one of said electrical operating devices for said links, each of said character coding relays including a switch having a contact connected to a pre-determined combination of said counting relays thereby to operate a pre-determined combination of the electrical devices connected to said counting selector links upon operation of any character coding relay.

4. A tape perforating machine according to claim 1 comprising, in addition, a plurality of counting selector links forming part of mechanism for indicating the unit width of each letter or character corresponding to a depressed key, an electrical operating device connected to each of said links to operate the same when energized, a plurality of counting relays each having one or more switches each connected to one of said electrical operating devices for said links, each of said character coding relays including a switch having a contact connected to a pre-determined combination of said counting relays thereby to operate a pre-determined counting relay upon operation of any character coding relay, and means for operating one or another counting relay upon operation of any character coding relay dependent upon operation of an upper case key or a lower case key.

5. A tape perforating machine according to claim 1 comprising, in addition, a plurality of counting selector links forming part of mechanism for indicating the unit width of each letter or character corresponding to a depressed key, an electrical operating device connected to each of said links to operate the same when energized, a plurality of counting relays each having one or more switches each connected to one of said electrical operating devices for said links, each of said character coding relays including a switch having a contact connected to a pre-determined combination of said counting relays thereby to operate such combination of counting relays upon operation of any character coding relay, means for operating one or another counting relay upon operation of any character coding relay dependent upon operation of an upper case key or a lower case key, said means comprising a single-pole double-throw switch for each letter or other character, each of said single-pole double-throw switches having a movable contact connected to a contact of the switch forming part of the character coding relay which is connected to the counting relays, means responsive to depression of an upper case key or a lower case key to move the movable contact of the single-pole double-throw switch into engagement with one or the other of the fixed contacts thereof, and connections between the fixed contact of each single-pole, double-throw switch and one of said counting relays.

6. A tape perforating machine according to claim 5, in which the means to move the movable contact of the double-pole double-throw switch comprises a counting selector relay having two operating coils and an armature which is movable to either of two positions upon energization of one or the other of said coils, a switch forming part of and operable by the shift coding relay and having a contact connected to one coil of the counting selector relay, and a switch forming part of and operable by the unshift coding relay and having a contact connected to the other coil of the counting selector relay.

7. A tape perforating machine according to claim 1 comprising, in addition, a circuit breaker having a plurality of switches each of which is in the connection between a switch contact of the character coding relays and said electrical devices, and means operable upon depression of any letter or character key to energize said circuit breaker to open the switches forming part thereof.

8. A tape perforating machine for producing a tape used to control a typesetting machine, comprising a keyboard having separate upper case and lower case keys for each letter of the alphabet, a plurality of tape perforating punches, means for operating said punches including a punch bar associated with each punch and normally removed therefrom but movable into operative relation thereto to permit operation of the associated punch, an electrical device connected to each punch bar to operate the same when the electrical device is energized, electrical means operable upon initial depression of each upper or lower case key for the same letter, if the preceding depressed letter key was of different case, to move into operative relation to their associated punches a first group of punch bars arranged to produce a tape perforation characteristic of the case of the depressed key, electrical means operable upon further depression of the same key to move into operative relation to their associated punches a second group of punch bars arranged to produce a tape perforation characteristic of the letter of the depressed key, and means for inhibiting operation of the second group of punch bars until the first group of punch bars has moved out of operative relation to their associated punches, said inhibiting means comprising a circuit breaker in the circuit of said electrical devices which is operable when open to prevent operation of those electrical devices which are connected to the second group of punch bars, means operable upon initial depression of each upper or lower case key, if the preceding depressed letter key was of different case, to operate said circuit breaker to prevent operation of those electrical devices which are connected to the second group of punch bars, means operable during such operation of the circuit breaker to operate those electrical devices which are connected to the first group of punch bars, and means operable after operation of the electrical devices connected to the first group of punch bars to de-energize such electrical devices and energize those electrical devices which are connected to the second set of punch bars.

9. A tape perforating machine comprising a keyboard having separate upper case and lower case keys for each letter of the alphabet and for other characters, tape perforating punches, a punch bar associated with each punch and normally removed therefrom but movable into operative relation thereto to permit operation of the associated punch, an electrical device connected to each punch bar to operate the same when energized, means operated by depression of any of said keys to operate one or more of said electrical devices in a combination which is characteristic of both the upper case and the lower case of the letter or character of the depressed key, means for moving the operated punch bars against their associated punches to produce a tape perforation characteristic of the letter or character of the depressed key, latch means operable on initial depression of the depressed key for holding the circuit of said electrical devices closed until completion of the punch, means for preventing further operation of the punch bar moving means after operation thereof to produce one tape perforation, and means for releasing the latch means to permit release of said electrical devices on release of the key.

10. A tape perforating machine according to claim 12 comprising, in addition, means for disconnecting the contacts of said shift and unshift coding relays from the first contact member associated with each key, separate shift and unshift keys, and means operable by depression of said separate shift and unshift keys after operation of said disconnecting means for operating the shift and unshift coding relays.

References Cited in the file of this patent

UNITED STATES PATENTS

| | | |
|---|---|---|
| 2,069,240 | Goetz et al. | Feb. 2, 1937 |
| 2,222,631 | Potts | Nov. 26, 1940 |
| 2,353,034 | Holt | July 4, 1944 |
| 2,679,902 | Brewer | June 1, 1954 |
| 2,737,240 | Brewer | Mar. 6, 1956 |
| 2,784,785 | Doty | Mar. 12, 1957 |
| 2,859,276 | Saykay | Nov. 4, 1958 |
| 2,902,092 | Hildebrandt | Sept. 1, 1959 |